(12) United States Patent
Nadgouda et al.

(10) Patent No.: US 8,376,460 B2
(45) Date of Patent: Feb. 19, 2013

(54) SEAT TRACK ASSEMBLY

(75) Inventors: Prasad Nadgouda, Maharashtra (IN); Prasad Ghalsasi, Maharashtra (IN); Ashok Ramteke, Maharashtra (IN)

(73) Assignee: Hema Engineering Industries Limited, Pune (IN)

( * ) Notice: Subject to any disclaimer, the term of this patent is extended or adjusted under 35 U.S.C. 154(b) by 420 days.

(21) Appl. No.: 12/652,797

(22) Filed: Jan. 6, 2010

(65) Prior Publication Data

US 2010/0213751 A1    Aug. 26, 2010

(30) Foreign Application Priority Data

Feb. 26, 2009 (IN) .......................... 437/MUM/2009

(51) Int. Cl.
*F16M 13/00* (2006.01)
*A47C 1/00* (2006.01)

(52) U.S. Cl. ................ 297/344.11; 297/344.1; 248/429; 248/430

(58) Field of Classification Search .................. 297/341, 297/344.1, 344.11, 463.1; 248/429, 430
See application file for complete search history.

(56) References Cited

U.S. PATENT DOCUMENTS

| | | | | |
|---|---|---|---|---|
| 5,785,292 A * | 7/1998 | Muraishi et al. | ............... | 248/429 |
| 6,113,051 A * | 9/2000 | Moradell et al. | ............... | 248/430 |
| 6,308,589 B1 * | 10/2001 | Schuler et al. | .................. | 74/538 |
| 6,322,036 B1 * | 11/2001 | Tame et al. | .................... | 248/429 |
| 6,772,985 B2 * | 8/2004 | Lee | ............................... | 248/424 |
| 7,100,984 B2 * | 9/2006 | Epaud et al. | .................. | 297/341 |
| 7,328,877 B2 * | 2/2008 | Yamada et al. | ............... | 248/430 |
| 2007/0176072 A1 * | 8/2007 | Ikegaya et al. | ............... | 248/429 |
| 2008/0202177 A1 * | 8/2008 | Abdella et al. | .................. | 70/261 |

* cited by examiner

*Primary Examiner* — David Dunn
*Assistant Examiner* — Philip Gabler
(74) *Attorney, Agent, or Firm* — Ladas & Parry LLP

(57) ABSTRACT

The problem to be solved is to provide a seat track assembly which is simple, easy to operate seat track assembly where locking is simplex and intact and which renders a smooth sliding of seat and the problem is solved by providing a seat track assembly with a lower channel, upper channel, latch bracket, latch pin, lever and sliding assemblies wherein sliding assemblies provide a streamlined sliding to the upper channel and at the desirable position latch pin engages with the lower channel to lock the seat track mechanism from moving further forward or rearward.

13 Claims, 11 Drawing Sheets

SECTION A-A

SEAT TRACK ASSEMBLY

TECHNICAL FIELD

The present invention relates to a seat track assembly. More particularly, the invention relates to a seat track assembly fixed to lower structure of seat and floor for moving the seat with respect to floor. The track assembly may be used in vehicle seats as well as seats or track structures of any kind.

BACKGROUND

The prior art describes various kinds of seat track assemblies used for securing a desirable position of seat with respect to floor for enhancing occupant's comfort. In most of such seat track mechanisms, an upper channel, fixed to seat, is slidable over a lower channel, fixed to floor and these channels are provided with locking mechanism to lock the seat in the desirable position. Whenever the occupant wants to adjust the seat, the seat has to be slided to a preferred position, where it gets locked by means of locking mechanism.

Generally, a seat track mechanism is complex in construction which is operated from near the floor and uses a conventional bearing for facilitating sliding motion of an upper channel fixed to the seat over lower channel. One of the prior art U.S. Pat. No. 6,354,553 B1 describes a seat track assembly with positive lock mechanism where a conventional bearing is used for providing a fine sliding motion. Now, the need has aroused to develop a simple, easy to operate seat track assembly where locking is simplex and intact and which renders a smooth sliding of seat.

The present invention provides a seat track assembly with a lower channel, upper channel, latch bracket, latch pins, lever and sliding assemblies wherein sliding assemblies provide a streamlined sliding to the upper channel and at the desirable position latch pin engages with the lower channel to lock the seat track mechanism from moving further forward or rearward.

SUMMARY OF THE INVENTION

According to an embodiment of the invention, a seat track assembly comprises: a lower channel fixed to a floor, said lower channel comprising: a lower surface having a plurality of spaced slots; an upper channel slidable over said lower channel, fixed to lower structure of a seat, said upper channel comprising: an upper surface having a plurality of spaced slots; a latch bracket fixed to said upper channel; two latch pins placed between said lower channel and said upper channel, each of said latch pins comprising: an extrusion, three pins for engaging into said slots of said lower channel, two side tongues for engaging into said slots of said upper channel, each tongue being provided with a spring thereon, a central tongue for engaging into said slot of said upper channel; a lever operably connected to said latch bracket and latch pins, said lever comprising: two extruded surfaces for pushing said extrusion of said latch pin, a lever handle protruding through the upper channel; whereby in a latching position, the said pins of one of the latch pins engage into said slots to prevent the upper channel from sliding over said lower channel, thereby disallowing movement of the seat and when the lever handle is pulled, the extruded surface of the lever and the pushes the extrusion of the engaged latch pin upwards against the spring pressure to disengage the pins from the slots in the lower channel and engage the tongues with the slots to achieve an unlatching position, thereby allowing the upper channel to slide over the lower channel to enable movement of the seat.

According to another embodiment of the invention, the seat track assembly is provided wherein: said lower channel comprises: two side surfaces having round corners at bottom, and inwardly tapered surfaces at top; said upper channel comprises: two side surfaces having round corners at top, and outwardly tapered surfaces at bottom; and wherein said outwardly tapered surfaces guide into said inwardly tapered surfaces of lower channel.

According to another embodiment of the invention, the seat track assembly comprises: two sliding assembly comprising a pair of sliders, each of said slider comprising: a spacer, two balls, one connected to one end of the spacer and other connected to other end of the spacer, two short spacers, one connected to one of said balls and other connected to other of said balls.

According to another embodiment of the invention, the seat track assembly comprises a pair of said sliding assemblies, a lower sliding assembly being placed between said round corners of the lower channel and said outwardly tapered surfaces of the upper channel, and an upper sliding assembly being placed between said inwardly tapered surfaces of the lower channel and round corners of the upper channel.

According to another embodiment of the invention, a stopper is provided at each end of the tapered surfaces in said lower channel and an upward bent tongue is provided at each end of said upper channel to prevent the upper sliding assembly from coming out of the seat track assembly.

According to another embodiment of the invention, a stopper is provided close to each end of the lower surface of said lower channel and a downward bent tongue is provided next to each of said upward bent tongue in said upper channel to prevent the lower sliding assembly from coming out of the seat track assembly.

According to another embodiment of the invention, said lower channel is provided with a stopper and said upper channel is provided with stopper at each end next to downward bent tongue to control travel of the seat; wherein a fully forward position is achieved when said stopper and said stopper engage to prevent further travel of the seat in a forward direction; and wherein a rearmost position is achieved when said stopper in the lower channel and said stopper in the upper channel engage to prevent further travel of the seat in a rearward direction.

According to another embodiment of the invention, said upper channel is provided with holes for fixing said latch bracket to the upper channel with rivets passing through holes provided in the latch bracket and said holes of said upper channel.

According to another embodiment of the invention, lower surface of said latch bracket is provided with slots through which said pins of the latch pin pass to vertically engage into said slots of the lower channel.

According to another embodiment of the invention, a track handle is provided at side of base of the seat and a cable extends from said cable knob to said lever handle for pulling said lever.

According to another embodiment of the invention, said slots of the lower channel, said slots of said latch bracket through which the pins of said latch pin traverse and said slots of said upper channel are rectangular in shape.

According to another embodiment of the invention, said extrusion is round in shape.

According to another embodiment of the invention, a seat is provided with a pair of the seat track secured on both sides underneath the seat and joined to cable knob through cable.

Figure 1:
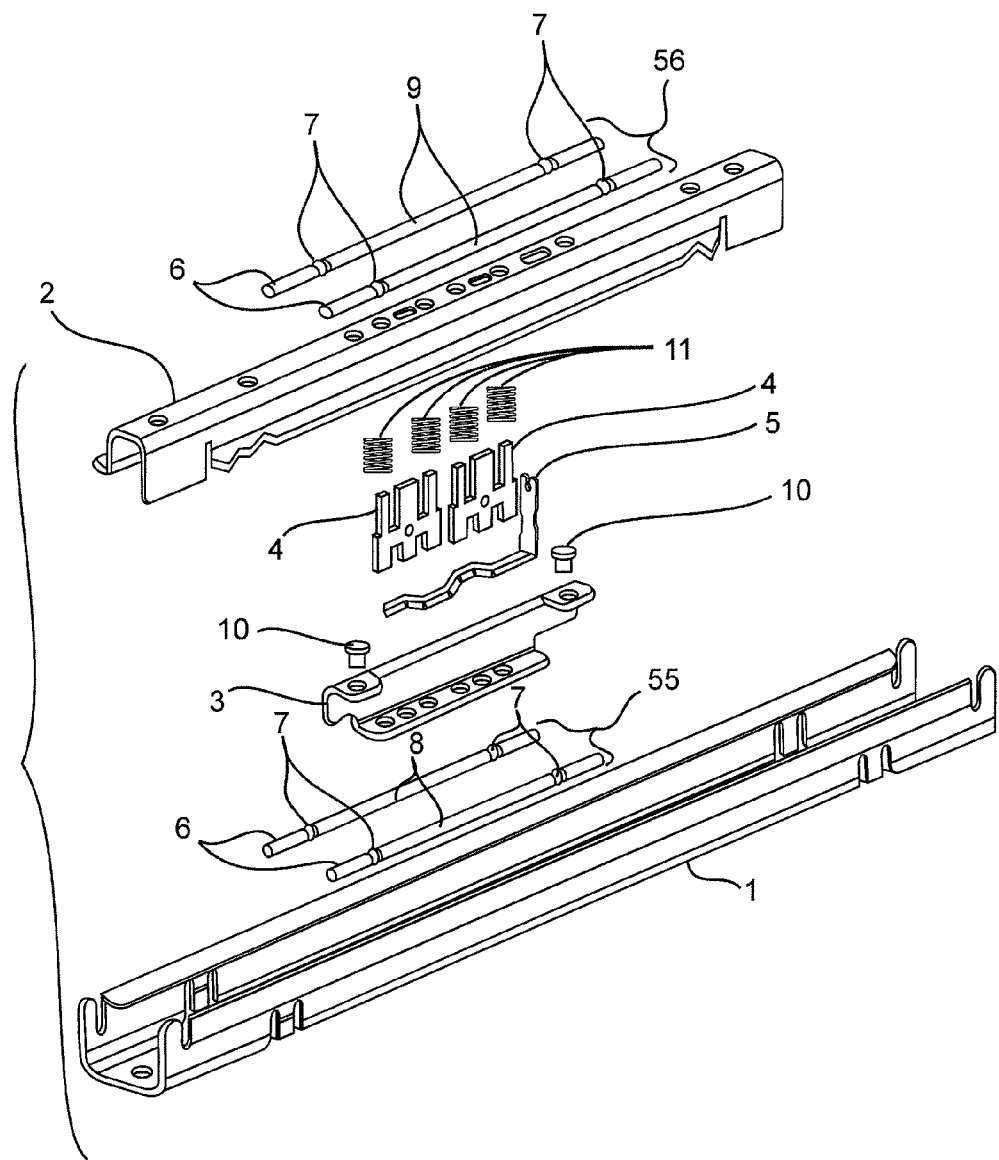
FIG. 1 illustrates an embodiment of present invention depicting the exploded view of the seat track assembly.

| Description of Elements | Reference numerals |
| --- | --- |
| Lower channel | 1 |
| Upper channel | 2 |
| Latch bracket | 3 |
| Latch pins | 4 |
| Lever | 5 |
| Short spacer | 6 |
| Ball | 7 |
| Spacer | 8 |
| Spacer | 9 |
| Rivet | 10 |
| Spring | 11 |
| Slots | 21 |
| Tapered surface | 22 |
| Holes | 23 |
| Stopper | 24 |
| Stopper | 25 |
| Round corner | 26 |
| Stopper | 27 |
| Slot | 31 |
| Round corner | 32 |
| Hole | 33 |
| Hole | 34 |
| Hole | 35 |
| Slot | 36 |
| Downward bent tongue | 37 |
| Upward bent tongue | 38 |
| Tapered surface | 39 |
| Stopper | 40 |
| Hole | 41 |
| Slot | 42 |
| Extrusion | 45 |
| Side tongue | 46 |
| Pin | 47 |
| Central tongue | 48 |
| Extruded surface | 51 |
| Lever handle | 52 |
| Slit | 53 |
| Cable | 54 |
| Lower sliding assembly | 55 |
| Upper sliding assembly | 56 |
| Cable knob | 57 |

DETAILED DESCRIPTION OF THE INVENTION

The present invention can be more fully understood by reading the following detailed description of some of the embodiments, with reference made to the accompanying drawings.

Figure 12:
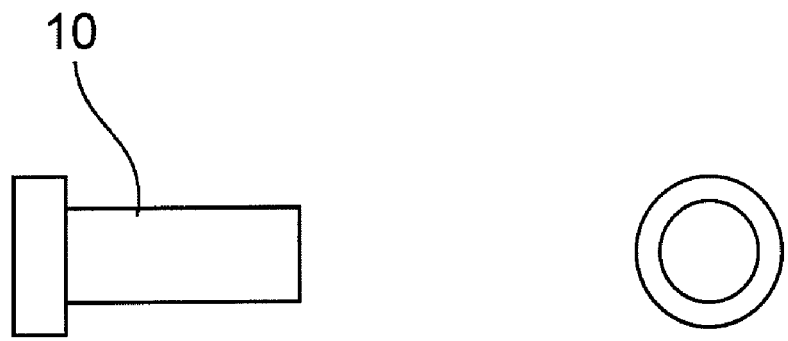
FIG. 12 depicts a rivet.

FIG. 1 illustrates an exploded view of the assembly according to an embodiment of the present invention. A lower channel (1) as shown in the assembly is provided with plurality of slots at regular intervals in its lower surface. The lower channel (1) is fixed to a floor with the help of rivets (10) as shown in FIG. 12. An upper channel (2), which is slidable over the lower channel (1) is fixed to lower structure of a seat with the help of rivets (10). The upper channel (2) comprises different holes and slots on its upper surface. A latch bracket (3), placed between the lower channel (1) and the upper channel (2), is fixed to the upper channel (2) with the help of rivets (10) passing through holes provided on the upper surface of latch bracket (3). Two latch pins (4), each of which is provided with three pins in its lower part for engaging into the slots on lower surface of the lower channel (1). Each of said latch pin (4) is also provided with side tongues and central tongue, in its upper part for engaging into the slots on the upper surface of the upper channel (2). In the latching position one of the two latch pins (4) is engaged into slots on lower surface of the lower channel (1) to prevent the upper channel (2) from sliding over the lower channel (1) and thus prohibit the movement of the seat. A lever (5), having two extruded surfaces and a lever handle is operably connected to said latch bracket (3) and latch pins (4) and helps the latch pin to engage and disengage into the slots on lower surface of the lower channel (1). Sliding assemblies (55, 56) as shown in the figure are provided between lower channel (1) and upper channel (2). Said sliding assemblies (55, 56) help in the smooth sliding of upper channel (2) over the lower channel (1), thereby allowing smooth movement of the seat. Each of sliding assemblies comprises a pair of sliders and each slider consists of a spacer (8, 9), two balls (7), one connected to one end of the spacer (8, 9) and other connected to other end of the spacer (8, 9) and two short spacers (6), one connected to one of said balls (7) and other connected to other of said balls (7). Further, a spring (11) is provided on each of said side tongues on upper part of the latch pin (4). The spring (11) helps in engaging the said latch pin (4) into slots provided on lower surface of the lower channel (1).

Figure 2:
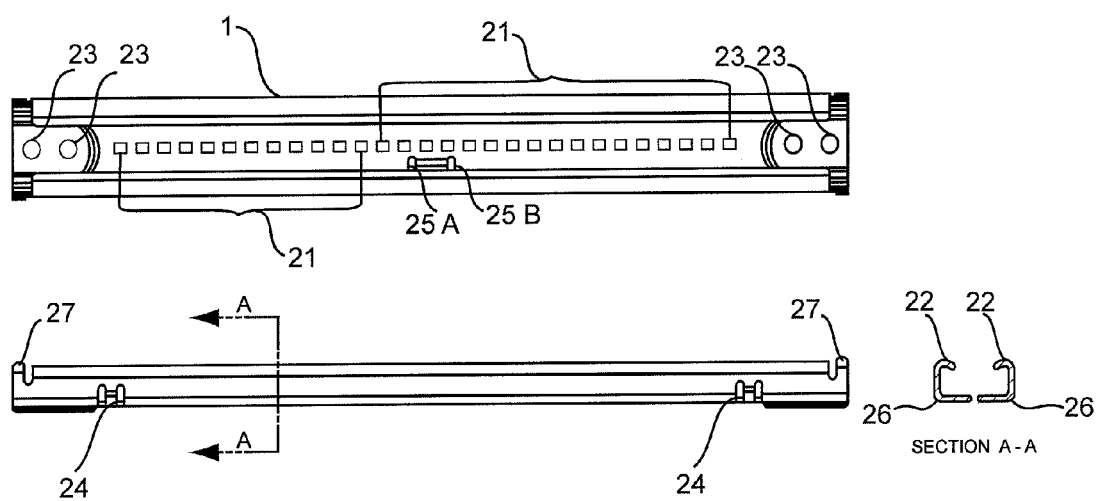
FIG. 2 depicts a lower channel with a top, side and cross sectional view.

FIG. 2 shows the lower channel (1) which is provided with holes (23) for fixing the lower channel (1) to floor with the help of rivets (10) passing through holes (23). The lower channel (1) being fixed to floor does not have any movement. This lower channel (1) is provided with plurality of equally spaced identical slots (21) wherein the pins provided on lower part of the latch pin (4) traverse in latching position. During unlatched position pins provided on lower part of the latch pin (4) are not engaged with the slots (21) of the lower channel (1). The slots (21) of the lower channel (1) can be provided with any shape consistent with the shape of pins provided on lower part of latch pins (4). However, in the present embodiment, the slots (21) are provided with rectangular shape. This rectangular shape of the slots (21) is in consistence with the pins provided in lower part of the latch pin (4). Two side surfaces of the lower channel (1) are having round corners (26) at bottom and inwardly tapered surfaces (22) at top. Said round corners (26) and inwardly tapered surfaces (22) provide lower channel (1) with the shape as shown in cross-sectional view of the FIG. 2. Further, the lower channel (1) is provided with a stopper (27) at each end of the tapered surfaces (22) and a stopper (24) close to each end of the lower surface for controlling the movement of sliding assemblies (55, 56). Stopper (25A, 25B) as shown in the figure is provided in the lower channel (1) to control travel of the seat.

Figure 3:
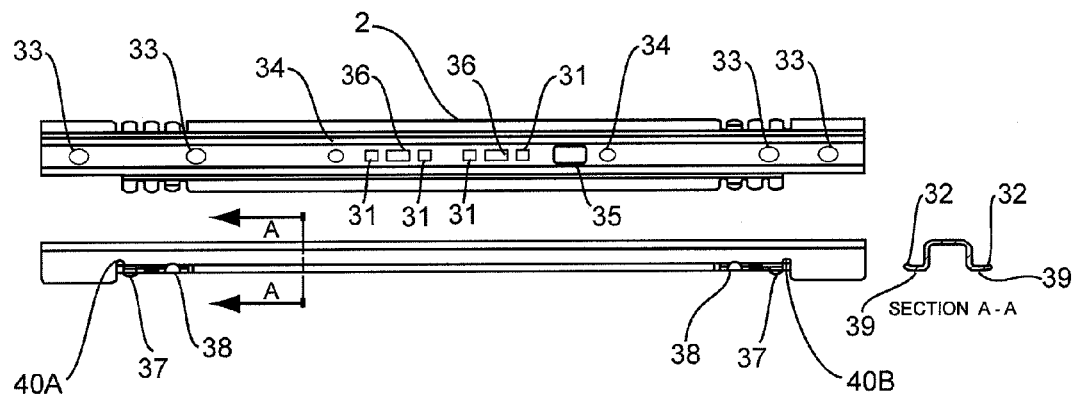
FIG. 3 depicts an upper channel with a bottom, side and cross sectional view.

FIG. 3 depicts the upper channel (2) which is provided with holes (33) in its upper surface, for fixing the upper channel (2) to lower structure of a seat with the help of rivets (10) passing through holes (33). As shown in the figure, holes (34) are provided in the upper surface of upper channel (2) for fixing latch bracket (3) to the upper channel (2) with rivets (10) passing through holes provided in the latch bracket (4) and holes (34) in the upper channel (2). Two side surfaces of upper channel (2) are having round corners (32) at top and outwardly tapered surfaces (39) at bottom as shown in the cross sectional view of the FIG. 3. Said outwardly tapered surfaces (39) of the upper channel (2) guide into the inwardly tapered surfaces (22) of the lower channel (1), thus, making the upper channel (2) slidable over the lower channel (1). The upper surface of upper channel (2) is further provided with plurality of spaced slots (31) and slots (36) for engaging, side tongues and central tongue provided on upper part of latch pins (4). Said side tongues and central tongue engage in the slots (31) and slots (36) respectively, only when said pins (47) of the latch pin (4) are not engaged within the slots (21) of the lower channel (1). Further the upper surface of upper channel (2) is provided with a hole (35) through which lever handle of the lever (5) protrudes. The hole (35) in the upper channel (2) is having a rectangular shape in the present embodiment. As shown in the side view of the figure, an upward bent tongue (38) is provided at each end of said upper channel (2) and a downward bent tongue (37) is provided next to each of said upward bent tongue (38), for controlling the movement of sliding assemblies (55, 56), with the help of stopper (24) and stopper (27) of the lower channel (1). A stopper (40A, 40B) next to the downward bent tongue (37) is provided which control travel of the seat by engaging itself with stopper (25A, 25B) of the lower channel (1).

Figure 4:
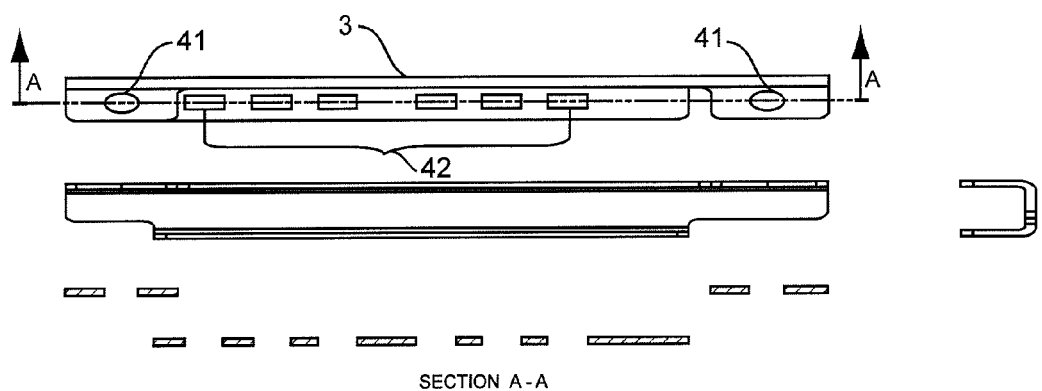
FIG. 4 depicts a latch bracket with a top, side and cross sectional view.

A latch bracket (3) as shown in FIG. 4 is placed between upper channel (2) and lower channel (1) and fixed to upper channel (1). It is provided with holes (41) on its upper surface to fix the latch bracket (3) to the upper channel (2) with the help of rivets (10) passing through holes (34) of the upper channel (2) and the holes (41) of the latch bracket (3). The lower surface of latch bracket (3) is provided with slots (42) through which pins provided in the lower part of the latch pins (4) pass and get vertically engaged into the slots (21) of the lower channel (1) during latching.

Figure 5:
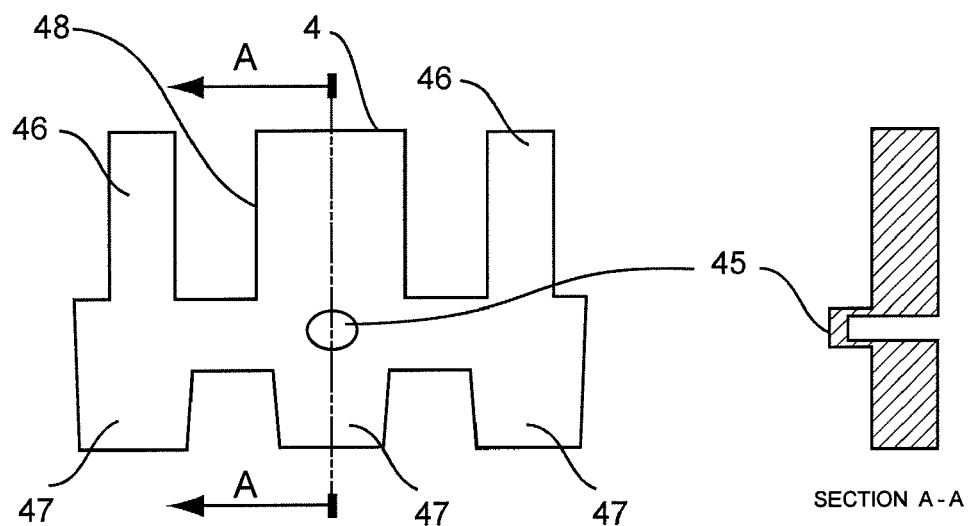
FIG. 5 depicts a latch pin and cross sectional view of the same.

FIG. 5 shows a latch pin (4) with three pins (47) in its lower part, which pass through slots (42) in the latch bracket (3) for engaging and disengaging from the slots (21) of the lower channel (1). Side tongues (46) are provided for engaging into slots (31) of the upper channel (2). A central tongue, wider than side tongues is provided for engaging into the slot (36) of the upper channel (2). The central tongue being wider than side tongues gives strength to the latch pin (4) and also helps in preventing the tilting of latch pin during latching and unlatching. The tongues (46, 48) engage into slots (31, 36) when the pins (47) of the latch pin (4) are not engaged with the slots (21) of the lower channel (1). An extrusion (45) is provided at the centre of the latch pin (4), which helps latch pin to engage and disengage from slots (21) in the lower channel (1). Said extrusion (45) is round in shape in the present embodiment. The latch pins (4) are two in number and help to attain the desired position of the seat. At one time only one latch pin is in operation and other latch pin is idle, i.e. at one time only the pins (47) of one latch pin (4) are engaged with the slots (21) of the lower channel (1) to disallow movement of the seat.

Figure 6:
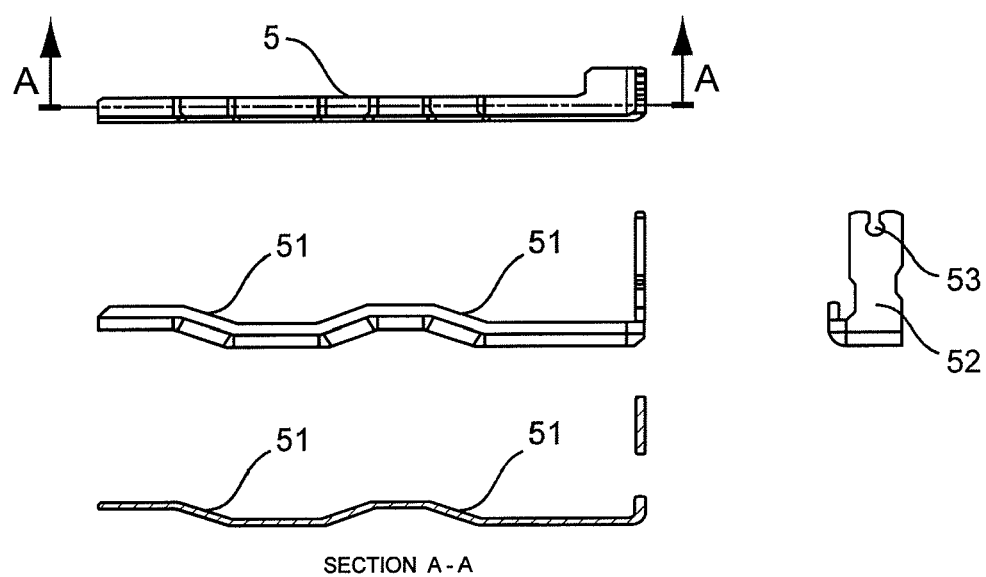
FIG. 6 depicts a lever and lever handle which are used for engagement and disengagement of latch pin in the lower channel.

A lever (5) as shown in FIG. 6 is operably connected to the latch bracket (3) and latch pins (4). A lever handle (52) having a slit (53) protrudes through the hole (35) provided in the upper channel (2). Two extruded surfaces (51) are provided for pushing the extrusion (45) of latch pin (4) upward to disengage the latch pins (4) from the slots (21) of the lower channel (1). When the lever handle is pulled the extruded surface (51) of the lever (5) pushes the extrusion (45) of the engaged latch pin (4) upwards to disengage the pins (47) from the slots (21) in the lower channel (1) and engage the tongues (46, 48) with the slots (31, 36) to achieve an unlatching position, thereby allowing the upper channel (2) to slide over the lower channel (1) to enable movement of the seat.

Figure 7:
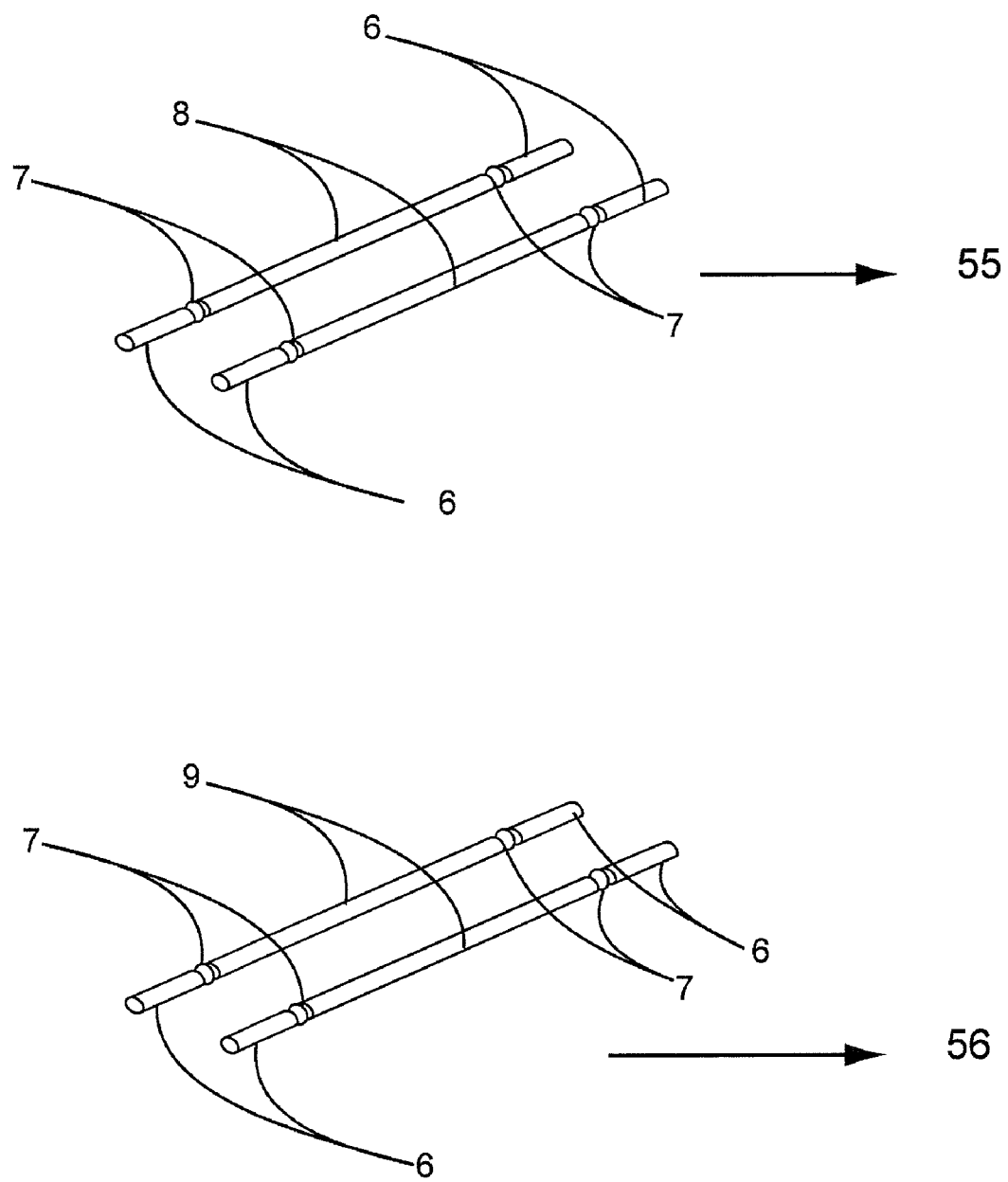
FIG. 7 depicts a lower sliding assembly and an upper sliding assembly.

FIG. 7 shows a lower sliding assembly (55) placed between the round corners (26) of the lower channel (1) and the outwardly tapered surfaces (39) of the upper channel (2). Further, FIG. 7 shows an upper sliding assembly (56) placed between said inwardly tapered surfaces (22) of the lower channel (1) and round corners (32) of the upper channel (2). These sliding assemblies act as a bearing to help in the smooth movement of the upper channel (2) over the lower channel (1). Each sliding assembly comprises a pair of sliders. Further, each slider is provided with a spacer (8, 9), two balls (7), one connected to one end of the spacer (8, 9) and other connected to other end of the spacer (8, 9) and two short spacers (6), one connected to one of said balls (7) and other connected to other of said balls (7).

Figure 8:
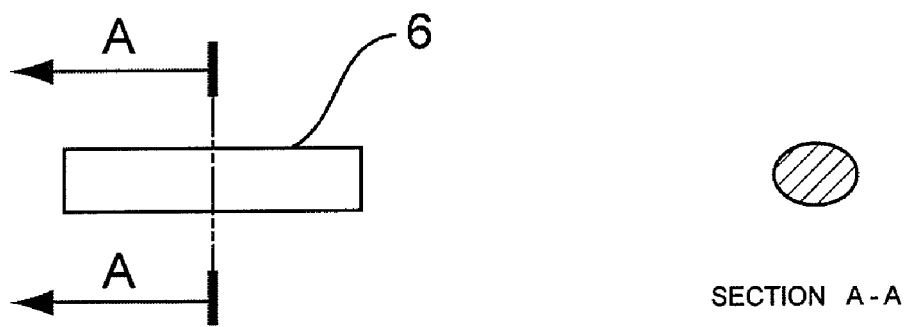
FIG. 8 depicts a short spacer and cross sectional view of the same.

FIG. 8 shows a short spacer (6) which forms a part of lower and upper sliding assemblies. One end of short spacer (6) is connected to the ball (7) in the slider and other end is free. Short spacer (6) is provided to hold the ball intact within the sliding assembly.

Figure 9:
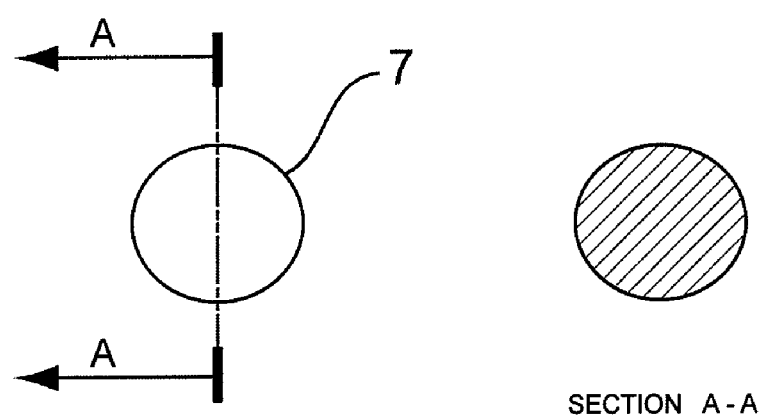
FIG. 9 depicts a ball and cross sectional view of the same.

FIG. 9 shows a ball (7), one end of which is connected to the short spacer (6) and other end to the spacer (8) in a slider. The ball (7) acts as a bearing to help upper channel (2) slide smoothly over the lower channel (1).

Figure 10:
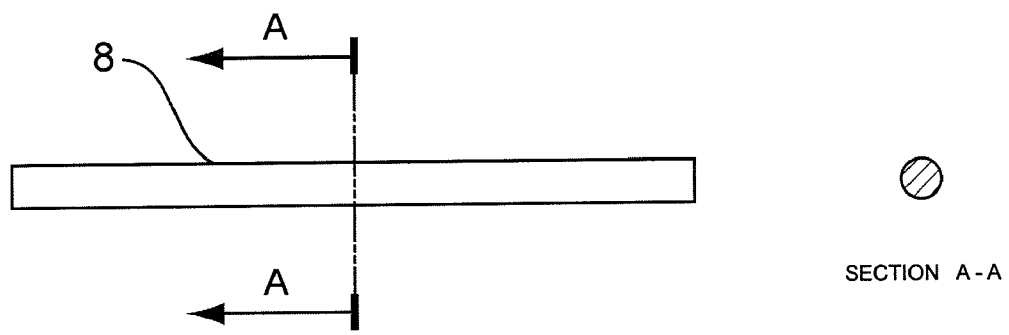
FIG. 10 depicts a spacer of the lower channel and cross sectional view of the same.

FIG. 10 shows the spacer (8) placed in the lower sliding assembly (55). One end of spacer (8) is connected to one ball (7) and the other end is connected to another ball (7), in a slider. The spacer (8) is provided to keep the balls (7) intact within the lower sliding assembly (55).

Figure 11:
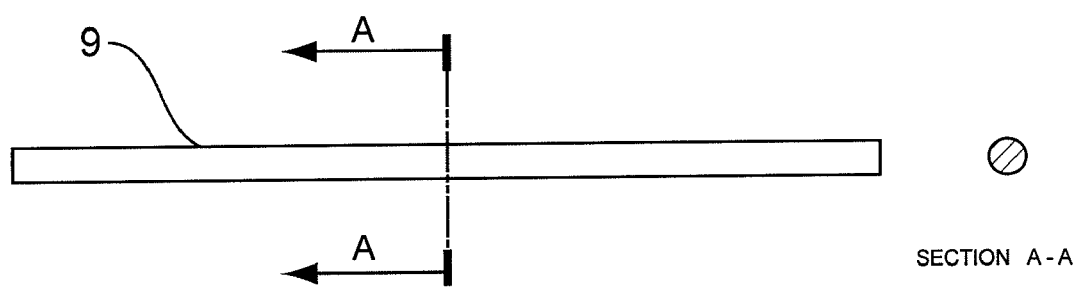
FIG. 11 depicts a spacer of the upper channel and cross sectional view of the same.

FIG. 11 shows the spacer (9) placed in the upper sliding assembly (56). One end of spacer (9) is connected to one ball (7) and the other end is connected to another ball (7). The spacer (9) is provided for keeping the balls (7) intact within the upper sliding assembly (56).

Rivet as shown in FIG. 12 attaches the latch bracket (3) to the upper channel (2). These rivets also fix the upper channel (2) to the lower structure of the seat and the lower channel (1) to floor.

Figure 13:
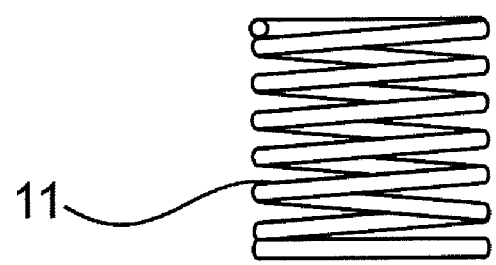
FIG. 13 depicts a spring.
Figure 13:
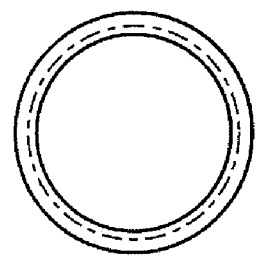

FIG. 13 shows a spring (11) which is placed on each of the side tongues (46) of said latch pin (4). During unlatching the latch pin (4) moves upward against the spring pressure to engage side tongues and central tongue in the slots (31) and slot (36) of the upper channel (2) respectively. During latching, due to spring pressure, the latch pin gets into the slots (21) of the lower channel (1) vertically and the complete mechanism gets locked.

Figure 14:
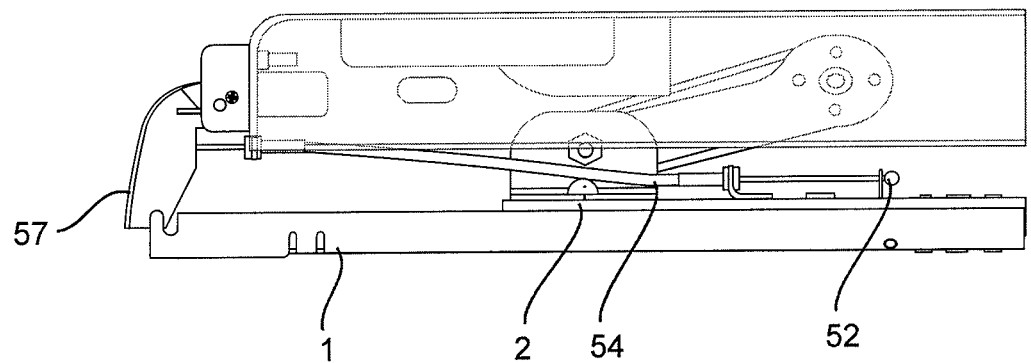
FIG. 14 shows the connection of cable within the seat track assembly.

FIG. 14 shows that the cable (54) is connected to cable knob (57), fixed to seat lower structure and lever handle (52) extruding from the upper channel (2). The figure shows how the upper channel (2) is guided in the lower channel (1). When the cable knob (57) is pulled, the lever handle (52) gets pulled by means of the cable (54). This movement of lever handle (52) compels the extruded surfaces (51) of the lever (5) to push the extrusion (45) of engaged latch pin (4) upwards, thereby disengaging the pins (47) of the engaged latch pin (4) from the slots (21) in the lower channel (1) and engaging the side tongues (46) and central tongue (48) of said engaged latch pin (4) with the slots (31) and (36) respectively, so that the unlatching position is achieved.

Figure 15:
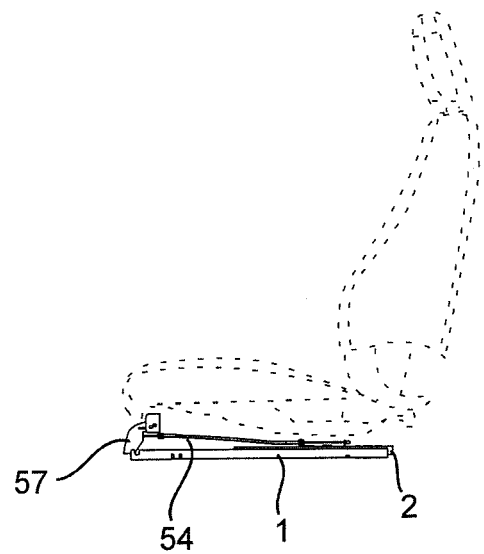
FIG. 15 illustrates the seat with the seat track assembly.

FIG. 15 illustrates the attachment of seat track assembly comprising lower channel (1), upper channel (2), cable (54) and cable knob (57) with the seat.

Figure 16:
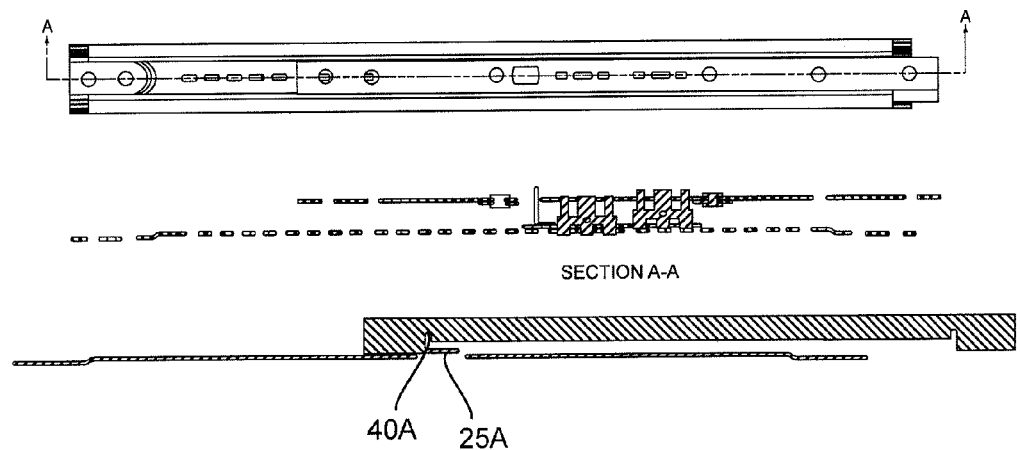
FIG. 16 illustrates fully forward position achieved by seat.

FIG. 16 illustrates a fully forward position of the seat achieved by the seat track assembly. This fully forward position is achieved when the stopper (25A) in the lower channel (1) gets engaged with the stopper (40A) in the upper channel (2) to prohibit further movement of seat in forward direction.

Figure 17:
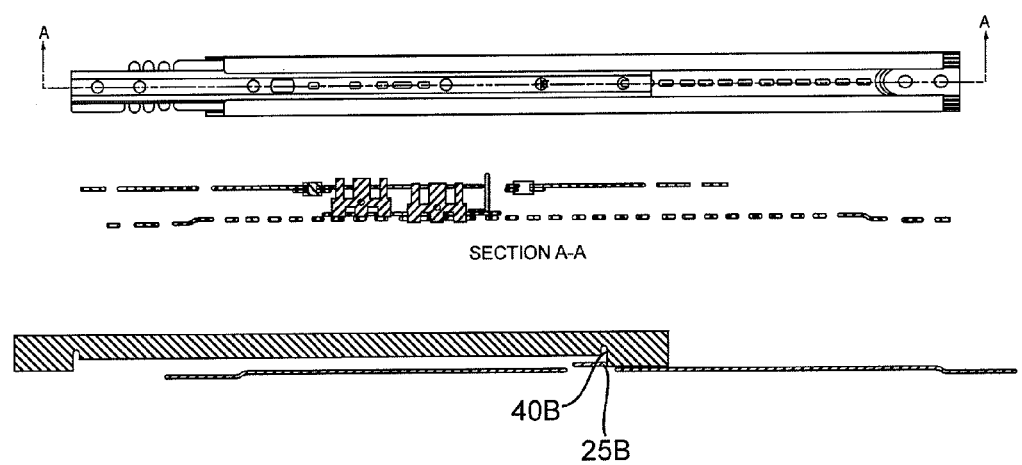
FIG. 17 illustrates rearmost position achieved by seat.

FIG. 17 illustrates a rearmost position of the seat achieved by the seat track assembly. This rearmost position is achieved when the stopper (25B) in the lower channel (1) gets engaged with the stopper (40B) in the upper channel (2) to prohibit further movement of seat in rearward direction.

Figure 18:
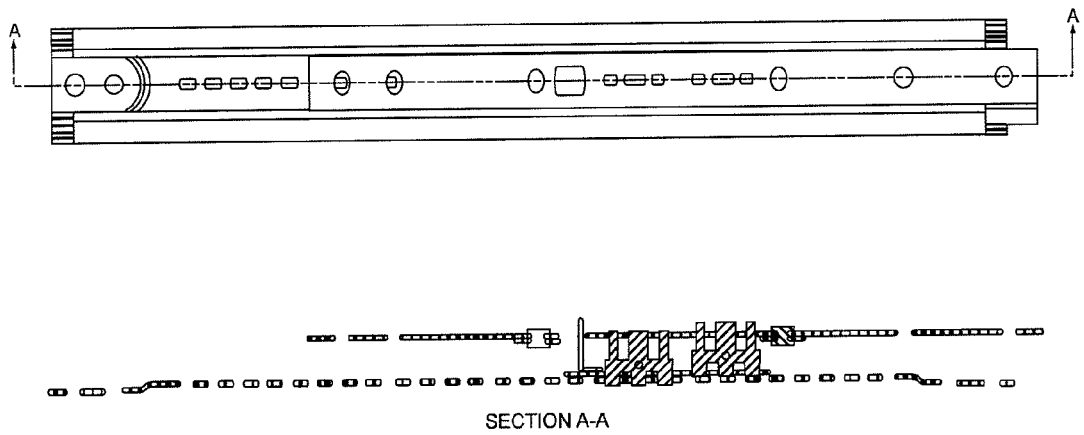
FIG. 18 illustrates desired position achieved by seat.

FIG. 18 illustrates a desired position of the seat achieved by the seat track assembly wherein the pins (47) of one of the latch pins (4) is engaged within the slots (21) in lower channel (1). This engagement of pins (47) with the slots (21) fixes seat in one position and disallow seat to move forward or rearward.

In an embodiment, a seat is provided with a pair of seat track assemblies which are secured to both sides of the seat. Both the seat track assemblies are identical to each other and connected to the cable knob (57) through their respective cables (54). Both the seat track assemblies work simultaneously in a harmonized way.

Figure 19:
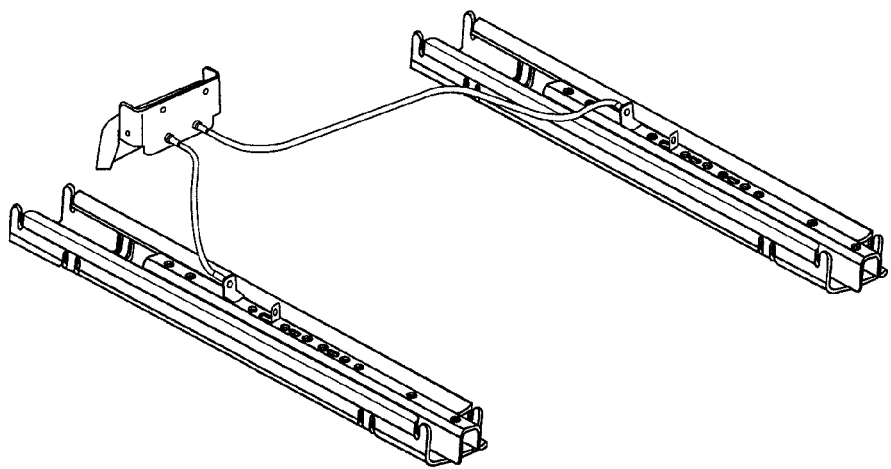
FIG. 19 illustrates connection of two seat track assemblies with each other

FIG. 19 illustrates the connection of cable with two seat track assemblies.

When the cable knob (57) is pulled, the lever handle (52), protruding through the upper channels (2) of both the seat track assemblies get pulled horizontally by means of the cable (54) connecting each lever handle (52) through cable knob (57). Both the seat track assemblies work in an identical fashion. Due to pulling of the lever handle (52), one of the extruded surfaces (51) of the lever (5) push the extrusion (45) of the latch pin (4), the pins (47) of which were engaged with the slots (21) of the lower channel (1), upwards, thereby disengaging the pins (47) of said engaged latch pin (4) from the slots (21) of the lower channel (1). The side tongues (46) and the central tongue (48) of said engaged latch pin (4) get engaged with the slots (31) and slot (36) of the upper channel (2) against the spring pressure, thereby unlatching the upper channel (2) with the lower channel (1). Thus said upper channel (2) becomes slidable over the lower channel (1). At this point, one can take the seat to one's desired position. Once the desired position is achieved, the cable knob is set free, which brings back the lever handle (52) protruding through the upper channels (2) to its normal position. Due to spring pressure the pins (47) of the latch pin (4) (which is just placed above the slots (21) of the lower channel (1)) gets vertically engaged in the slots (21) of the lower channel (1), thereby latching the seat track assembly. Latching disallows seat to move either forward or rearward. Thus the desired position of seat can be achieved by the help of the seat track assembly. More particularly, said seat track assembly in used in vehicle seats. However said seat track assembly can be used in any other seat, where the seat is to be adjusted with respect to floor.

We claim:

1. A seat track assembly comprising:
a lower channel (1) fixed to a floor, said lower channel comprising:
a lower surface having a plurality of spaced slots (21);
an upper channel (2) slidable over said lower channel (1), fixed to lower structure of a seat, said upper channel (2) comprising:
an upper surface having a plurality of spaced slots (31, 36);
a latch bracket (3) fixed to said upper channel (2);
two latch pins (4) placed between said lower channel (1) and said upper channel (2), each of said latch pins comprising:
an extrusion (45) oriented at right angles to a plane containing said upper and lower channels,
three pins (47) for engaging into said slots (21) of said lower channel (1), two side tongues (46) for engaging into said slots (31) of said upper channel (2), each tongue being provided with a spring (11) thereon,
a central tongue (48) for engaging into one of said slots (36) of said upper channel (2);
a lever(5) adapted to slide parallel to said upper and lower channels and operably connected to said latch bracket (3) and latch pins (4), said lever comprising:
two extruded surfaces (51) extending sideways from said lever for pushing a respective said extrusion (45) of each said latch pin (4), a lever handle (52) protruding through said upper channel (2);
said spring (11) being placed on each of said side tongues (46) of said latch pin (4);
whereby in a latching position, the said pins (47) of one of the latch pins (4) engage into said slots (21) in the lower channel (1) to prevent the upper channel (2) from sliding over said lower channel (1), thereby disallowing movement of the seat and when the lever handle (5) is pulled, the extruded surface (51) of the lever (5) pushes the extrusion (45) of the engaged latch pin (4) upwards against the spring pressure to disengage the pins (47) from the slots (21) in the lower channel (1) and engage the tongues (46, 48) with the slots (31, 36) to achieve an unlatching position, thereby allowing the upper channel (2) to slide over the lower channel (1) to enable movement of the seat.

2. The seat track assembly as claimed in claim 1, wherein:
said lower channel (1) comprises:
two side surfaces having round corners (26) at bottom, and inwardly tapered surfaces (22) at top;
said upper channel (2) comprises:
two side surfaces having round corners (32) at top, and outwardly tapered surfaces (39) at bottom; and
wherein said outwardly tapered surfaces (39) guide into said inwardly tapered surfaces (22) of lower channel (1).

3. The seat track assembly as claimed in claim 2, comprising:

two sliding assemblies (55, 56) each comprising a pair of sliders, each of said sliders comprising:
a spacer (8, 9),
two balls (7), one connected to one end of the spacer (8) and other connected to other end of the spacer (8, 9),
two short spacers (6), one connected to one of said balls (7) and other connected to other of said balls (7).

4. The seat track assembly as claimed in claim 3, comprising a pair of said sliding assemblies (55, 56), each of said sliding assemblies comprising a lower sliding assembly (55) being placed between said round corners (26) of the lower channel (1) and said outwardly tapered surfaces (39) of the upper channel (2), and an upper sliding assembly (56) being placed between said inwardly tapered surfaces (22) of the lower channel (1) and round corners (32) of the upper channel (2).

5. The seat track assembly as claimed in claim 2, wherein a stopper (27) is provided at each end of the tapered surfaces (22) in said lower channel (1) and an upward bent tongue (38) is provided at each end of said upper channel (2) to prevent the upper channel (56) from coming out of the seat track assembly.

6. The seat track assembly as claimed in claim 5, wherein a stopper (24) is provided close to each end of the lower surface of said lower channel (1) and a downward bent tongue (37) is provided next to each of said upward bent tongue (38) in said upper channel (2) to prevent the lower channel (55) from coming out of the seat track assembly.

7. The seat track assembly as claimed in claim 6, wherein said lower channel (1) is provided with a stopper (25A, 25B) and said upper channel (2) is provided with a stopper (40A, 40B) at each end next to downward bent tongue (37) to control travel of the seat;

wherein a fully forward position is achieved when said stopper (25A) in the lower channel and said stopper (40A) in the upper channel engage to prevent further travel of the seat in a forward direction; and
wherein a rearmost position is achieved when said stopper (25B) in the lower channel (1) and said stopper (40B) in the upper channel (2) engage to prevent further travel of the seat in a rearward direction.

8. The seat track assembly as claimed in claim 1, wherein said upper channel (2) is provided with holes (34) for fixing said latch bracket (3) to the upper channel (2) with rivets (10) passing through holes (41) provided in the latch bracket 3 and said holes (34) of said upper channel (2).

9. The seat track assembly as claimed in claim 1, wherein lower surface of said latch bracket (3) is provided with slots (42) through which said pins (47) of the latch pin (4) pass to vertically engage into said slots (21) of the lower channel (1).

10. The seat track assembly as claimed in claim 1, wherein a cable knob (57) is provided at side of base of the seat and a cable (54) extends from said cable knob (57) to said lever handle (52) for pulling said lever (5).

11. The seat track assembly as claimed in claim 1, wherein said slots (21) of the lower channel (1), said slots (42) of said latch bracket (3) integrated with upper channel (2), through which the pins (47) of said latch pin (4) traverse and said slots (31,36) of said upper channel (2) are rectangular in shape.

12. The seat track assembly as claimed in claim 1, wherein said extrusion (45) is round in shape.

13. A seat comprising a pair of said seat track assemblies claimed in claim 1, secured on both sides underneath the seat and joined to cable knob (57) through a cable (54).

* * * * *